United States Patent
Kitai et al.

[11] 3,903,539
[45] Sept. 2, 1975

[54] FOCAL PLANE SHUTTER BLADES FOR CAMERA

[75] Inventors: Kiyoshi Kitai, Tokyo; Eiichi Onda, Saitama; Mitsuo Koyama, Chiba; Shinji Nagaoka, Chiba; Tadashi Nakagawa, Chiba, all of Japan

[73] Assignee: Seiko Koki Kabushiki Kaisha, Japan

[22] Filed: Sept. 16, 1974

[21] Appl. No.: 506,026

Related U.S. Application Data
[63] Continuation of Ser. No. 345,592, March 28, 1973, abandoned.

[30] Foreign Application Priority Data
Mar. 28, 1972  Japan .................. 47-36566

[52] U.S. Cl. .............. 354/246; 354/245; 354/249; 354/250
[51] Int. Cl. ............................. G03b 9/20
[58] Field of Search ......... 354/226, 245, 246, 249, 354/250, 251

[56] References Cited
UNITED STATES PATENTS

| | | | |
|---|---|---|---|
| 2,975,689 | 3/1961 | Chatani | 95/55 |
| 3,580,156 | 5/1971 | Loseries | 95/60 |
| 3,628,438 | 12/1971 | Loseries | 95/59 |
| 3,683,778 | 8/1972 | Weiss | 95/60 |

*Primary Examiner*—Samuel S. Matthews
*Assistant Examiner*—Russell E. Adams, Jr.
*Attorney, Agent, or Firm*—Robert E. Burns; Emmanuel J. Lobato; Bruce L. Adams

[57] ABSTRACT

A focal plane shutter and shutter blade operating devices for a camera. The focal plane shutter has a plurality of shutter blades arranged in two separate groups operated independently of each other as a shutter-opening blade group and a shutter-closing blade group. A shutter blade operating mechanism comprises separate devices for opening and closing the shutter with the two groups independently of each other driven in the same direction. Each shutter blade group has a slit-forming or aperture-forming shutter blade and a swinging shutter blade driven separately from the other shutter blades of the groups. A main shutter blade-driving lever and an auxiliary parallel lever are both pivotally connected to each slit-forming shutter blade in each group of shutter blades. These two levers in each group of shutter blades are connected to the slit-forming shutter blades with pivots in a common plane and with these pivots on the blade spaced equally from the respective centers of rotation of the parallel levers. The parallel levers function in a parallel arrangement to maintain aperture-forming straight edges travelling across the exposure aperture of the shutter uniformly. The swinging blades in both groups in one embodiment of the invention are pivoted on respective ones of the parallel levers and in a second embodiment are pivoted on the slit-forming shutter blade transported by the operating parallel levers.

6 Claims, 5 Drawing Figures 3,903,539

FOCAL PLANE SHUTTER BLADES FOR CAMERA

This is a continuation, of application Ser. No. 345,592, filed Mar. 28, 1973 now abandoned.

BACKGROUND OF THE INVENTION

The present invention relates generally to camera shutters and more particularly to a new and improved focal plane shutter for a camera.

The use of a plurality of pivotally mounted shutter blades to open and close a shutter exposure aperture is known. Furthermore, the use of parallel control elements to control the formation of the shutter aperture is likewise known. In these known devices, all of the blades, even if they are divided into separate groups for opening and closing of the shutter, are mounted on the parallel levers or parts for driving them. Thus the inertia in driving the entire set of blades for a particular mode of operation limits the performance of the shutter as to maintaining accuracy in opening the shutter and accuracy in repetition of the motion of opening and closing the shutter.

With the advent of smaller size cameras, it has become necessary to have the shutter blades made smaller in focal plane shutters, and there is a limit to the complexity and the number of operating elements in the shutter. A particular problem has been the control of the slit-forming or aperture-forming blade of a group that controls the development of the opening and closing of the shutter aperture.

SUMMARY OF THE INVENTION

It is a principal object of the present invention to provide a smaller and more durable focal plane shutter with improved uniformity of slit-forming or aperture opening and closing.

In the focal plane shutter according to the invention, a plurality of shutter blades are divided into a shutter-opening group and a shutter-closing group. The shutter operating mechanism comprises a shutter-opening device which has a set of parallel levers pivoted at one end on a given side of the shutter aperture and a second set of parallel levers having their pivots spaced and substantially in the same plane as the before-mentioned levers. The two sets of parallel levers are pivotally connected to a respective slit-forming shutter blade of the corresponding or respective group of shutter blades and the pivots thereof are in the same plane. In each set of parallel levers, the pivotal connections to the respective shutter blade are equally spaced from the center of rotation of the two corresponding levers.

Each group of shutter blades has a swinging blade that in one embodiment is pivotally supported on one of the parallel levers and in the other embodiment is pivotally supported on the slit-forming shutter blade. This further divides the shutter blade groups into smaller sub-groups reducing the inertia of the shutter blades.

The shutter-operating mechanism has driving and closing levers that operate the two sets of parallel levers for driving the blades in the same direction for opening and closing of the shutter. The two groups of shutter blades have the slit-forming shutter blade connected to a respective set of the parallel levers for forming the shutter aperture uniformly.

BRIEF DESCRIPTION OF THE DRAWINGS

Other features and advantages of the focal plane shutter in accordance with the present invention will be better understood as described in the following specification and appended claims, in conjunction with the following drawings, in which:

DESCRIPTION OF THE PREFERRED EMBODIMENTS

Figure 1:
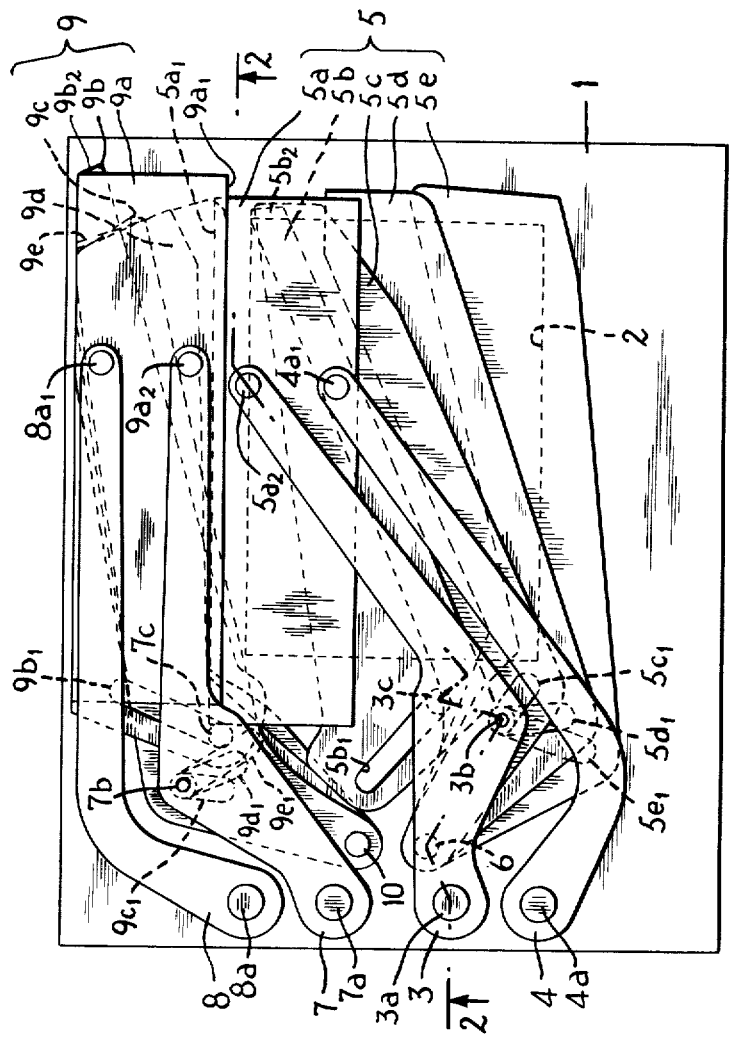
FIG. 1 is a plan view of the interior of a focal plane shutter in accordance with the invention and illustrated in a cocked condition.

The shutter according to the invention, as illustrated in the drawings, comprises a base board 1 and a second board or plate 11 each having a window or shutter aperture 2 in registry with each other. On the base board 1 are mounted devices for opening and closing the shutters, constituting the shutter-operating mechanism, not shown. These devices are generally known and may comprise a shutter-opening lever biased in a clockwise direction, by a biasing spring about a pivot. This lever is provided with an operating extension. The shutter is shown in a cocked condition in FIG. 1 and cocking mechanism not illustrated is movable in a direction of the necessary movement.

A release lever pivotally mounted on the base board is provided with a hook for engaging and releasably holding the shutter-operating lever. The release lever is rotationally biased in a clockwise direction by a spring about a pivot and has a second operating arm on which is carried a pin extending, in the drawing, downwardly on the underside of the operating arm.

The shutter-closing mechanism or device comprises a shutter-closing lever pivotal on the base plate on a pivot and having an operating arm actuated by the cocking mechanism and its means for cocking the shutter to the position illustrated in FIG. 1. A closing pawl is provided and has an arm biased in a counterclockwise direction by a spring about a pivot. The pawl is provided with a magnetizable or magnetic element attractable by an electromagnet secured by a fastener on the base plate.

As indicated heretofore, the shutter is illustrated in FIG. 1 in a cocked condition. When the cocking mechanism is actuated, a cocking pin, not shown, engages the release lever arm and rotates it into a position in which the release lever hook engages it and holds it against the action of its spring. In cocking the shutter, a cocking pin engages the operating or cocking lever arm of the closing lever and rotates it in a counterclockwise direction so that the closing pawl releasably holds it with its hook. When the release lever is biased in a counterclockwise direction, its pin engages a flat surface of the hook and biases the pawl in a direction for seating the magnetic element against the electromagnet. In the position illustrated in the cocked condition, the pawl is releasably held and will be held in an attracted, releasable position when the electromagnet is electrically energized when an exposure is being taken. These mechanisms may be constructed as in copending application Ser. No. 343,500.

Within the shutter, a space is defined between the base plate 1 and the second plate 11 spaced therefrom and secured thereto by mounting means, not shown. Within this space is mounted a parallel system constituting an operating parallel lever 3 pivotal about a pivot pin $3a$ of the shutter-opening lever, not shown. A second parallel lever 4 is pivotal on a pin $4a$. The two arms are pivotally connected at pivot pins $5a_2$, $4a_1$ on a shutter-opening blade 5a which is an aperture-forming shutter blade or slit-forming shutter blade of a group of shutter-opening blades 5. The group of shutter-opening blades comprises the slit-forming blade 5a, a swinging shutter blade 5b, and a plurality of other shutter blades $12c$–$12e$ pivotal about a pivot 6. These pivoted shutter blades have elongated slots $5c_1$–$5e_1$ into which extends an operating or driving pin 3b on the operating lever 3 for actuating these shutter blades as hereinafter described.

The aperture-forming shutter blade 5a is transported separately by the parallel levers 3, 4 and is not pivotally mounted in the manner of the other shutter blades of the shutter-opening group 5 of which it is a member. The pivotal connections $5a_2$, $4a_1$ to the parallel supporting levers 3, 10 are disposed in a common plane which is substantially a medial plane passing within the straight boundaries of the exposure or shutter aperture 2. When the two parallel levers operate these pivotal pin connections move substantially along this same medial plane. The two pivot connections are connected equally spaced from the centers of rotation $3a$, $4a$ of their respective levers. These centers of rotation are substantially disposed in a common plane.

Figure 2:
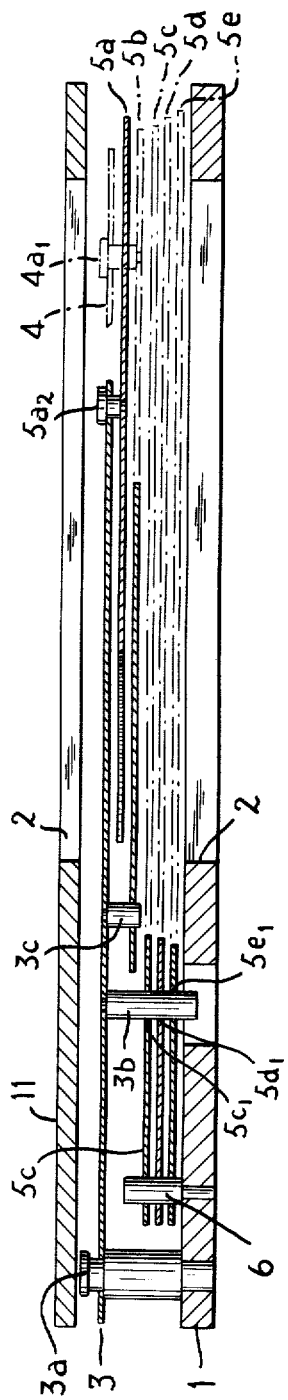
FIG. 2 is a cross section view taken along section line 2—2 of FIG. 1.

The pivot $4a_1$ supports or provides a pivot for the swinging blade 5b, as is best shown in FIG. 2. The swinging blade 5b has an elongated slot $5b_1$ within which an operating pin $3c$, on the operating parallel lever 3, is disposed. Said pivot $4a_1$, is between the elongated slot $5b_1$ and the other end $5b_2$, of the swinging blade, which is outside the exposure aperture. The manner of connection and the construction of these levers is such that when the two parallel levers are operated, for one angular displacement thereof, for example clockwise for opening the shutter (FIG. 1 to FIG. 3), while the swinging shutter blade is displaced thereby in a angular direction opposite thereto, that is, counterclockwise (as shown by the same figures). The aperture-forming blade 5a has a slit-forming edge $5a_1$ thereof move substantially normal to the plane in which the two pivotal pin connections $5a_2$–$4a_1$ are disposed. The latter two pin connections are normal to the plane of the shutter blade 5 $a$, so that the straight edge $5a_1$ defines a uniform slit as the aperture is opened or developed.

The shutter-closing mechanism constitutes two operating parallel levers 7, 8, pivotally mounted on the pivot $7a$ of the closing lever and on a pivot $8a$ respectively. These two parallel levers are mounted relative to the exposure aperture 2 on the same side thereof. The centers of rotation of these two levers are in the same plane as the centers of rotation of the two shutter-closing parallel levers 3, 4. The two closing parallel levers 7, 8 support a shutter-closing, slit-forming shutter blade 9a of a group 9 of shutter-closing blades independently of the remaining, separate shutter-closing blades $9c$–$9e$ of the group 9. The shutter-closing blades $9c$–$9e$ are pivotally mounted to pivot about a pivot 10 and are provided with individually elongated slots $9c_1$–$9e_1$ within which is received an operating pin $7b$ transported by the shutter-closing lever 7.

A swinging blade 9b is pivotally supported by the pivot $8a_1$, between an elongated slot $9b_1$, and its free end $9b_2$ outside of the exposure aperture. An operating pin $7c$ carried by the operating parallel lever 7 received in the elongated slot $9b$, actuates or swings the swinging blade.

OPERATION

When a photograph or exposure is to be taken, the camera exposure or release lever, not shown, is released or actuated. When a photograph is to be taken, the release mechanism of the camera will operate the electronic control circuit of the camera, not shown, so that the electromagnet is energized and the magnetic part of the closing hook or pawl is maintained attracted even though mechanically released. The camera release mechanism, not shown, operates the operating arm of the release lever, so that its engaging hook is rotated in a counterclockwise direction against the action of its biasing spring and the relase hook releases the hook of the operating, shutter-opening lever, so that it is rotated in a clockwise direction by its biasing or operating spring. As the shutter-opening lever is actuated, its pivot pin is rotated so that the operating parallel lever 3 is rotatably driven. As the operating, parallel lever 3 actuates the slit-forming opening shutter blade 5a, the second parallel lever 4 assists in the movement of that shutter blade in a mode heretofore described. The movement of the parallel lever 3 carries the operating pins 3b, 3c along the respective elongated slots of the blades 5c to 5e and blade 5b, respectively so that they are operated sequentially to the open position in a superposed position illustrated in FIG. 3. The slit-forming blade is the trailing blade and its trailing edge $5a_1$ develops a uniform slit as the shutter is opened.

Once an exposure has been taken and the delay time has been auotmatically controlled by the control circuitry of the camera, not shown, the exposure is terminated by applying a signal to the control circuit, in a known manner, that de-energizes the electromagnet. When the electromagnet is de-energized, the spring of the closing pawl or lever biases it in a direction for releasing the shutter-closing lever which is accordingly released and its pivot is rotated, thereby rotating the shutter-closing, parallel lever 7, which moves the shutter-closing blade 9a and its slit-forming, leading edge $9a_1$ to develop a uniform slit during closing of the shutter aperture.

Figure 3:
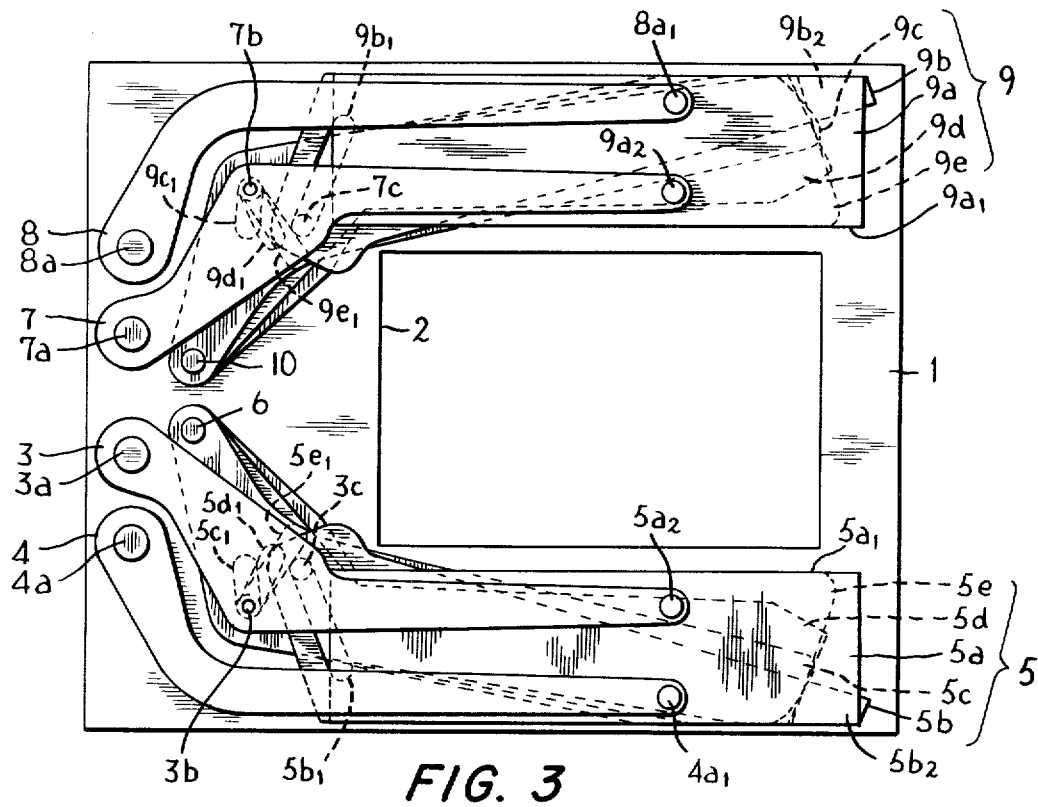
FIG. 3 is a plan view of the interior of the focal plane shutter in FIG. 1 illustrating the shutter blades in an open condition.
Figure 4:
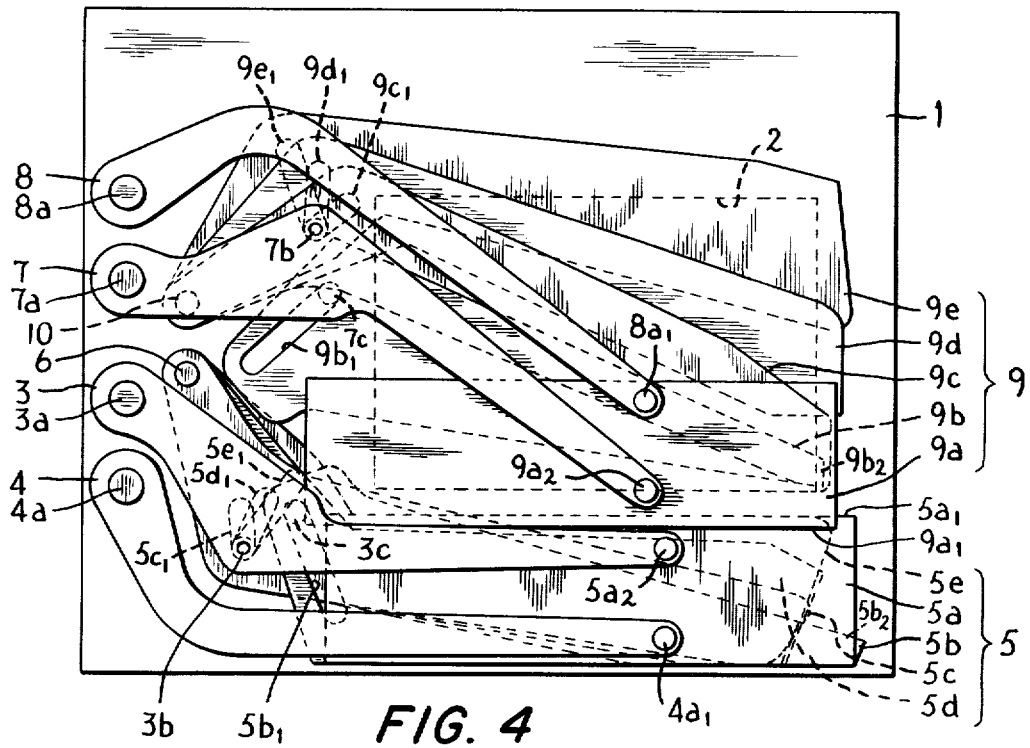
FIG. 4 is a plan view of the shutter in FIG. 4 illustrating the shutter with the shutter blades in a closed condition.

The direction of movement of the shutter-closing blades 9 to the superposed position (FIG. 3 to FIG. 4) is in the same direction in which the shutter-opening blades 5 are operated to expose the aperture 2 (FIG. 1 to FIG. 3). The movement of the parallel lever 7 transports along with it the associated parallel lever 8 to maintain the movement of the slit-forming shutter blade 9a as before described. Moreover, the movement of the main operating parallel lever 7 transports its operating pins 7b, 7c so that they move along the respective slots $9b_1$–$9c_1$ to move the shutter-closing blades 9b–9e in sequence and spread them out in an arrangement which is fan-shaped, closing the shutter with the slit-forming shutter blade 9a being the advance shutter blade in the shutter-closing movement. By contrast, as shown in FIGS. 4 and 1, when the shutter-opening blades 5 are returned to their closing position, for subsequent opening of the aperture 2, their direction of movement is the opposite one.

Figure 5:
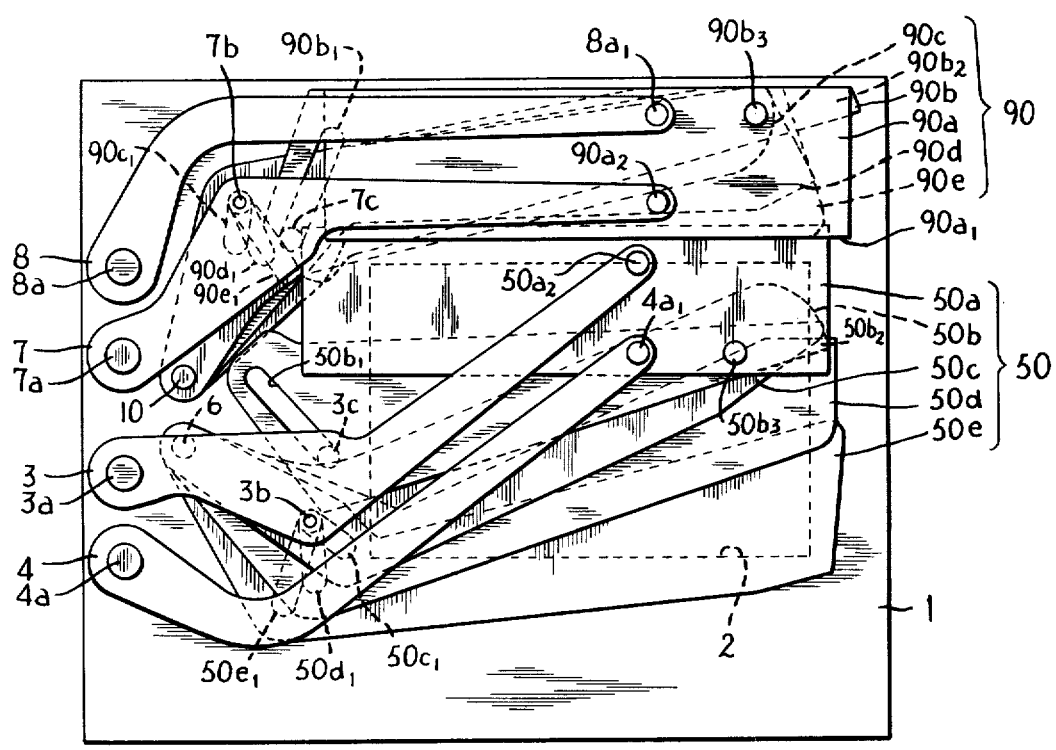
FIG. 5 is a plan view of the shutter blades within a modified shutter in a condition corresponding to that shown in FIG. 2.

A second embodiment of a focal plane shutter, embodying the invention is illustrated in FIG. 5. In this embodiment the two sets of paired parallel levers 3, 4 and 7, 8 are illustrated and designated by reference numerals corresonding to those of the previously described embodiment. In this instance the shutter has a set of group of shutter-opening blades 50 for opening the shutter and a shutter-closing blade group 90 for closing the shutter.

The shutter-opening blade group 50 has a slit-forming shutter blade 50a, supported on the two parallel levers 3, 4. A swinging blade 50b is provided as in the first embodiment. However, in this instance, the swinging blade is pivotally mounted on a pivot $50b_3$ on the slit-forming blade 50a. The remainder of the shutter-opening group of blades 50 comprise shutter blades 50c–50e pivotally mounted on a pivot 6. The swinging blade has an elongated slot $50b_1$ in which the operating pin 3c on the main operating parallel lever 3 is disposed and the pivoted shutter blades have elongated slots of $50c_1$–$50e_1$ within which a pin 3b on the main operating lever 3 is received. Thus, when the parallel lever 3 is actuated the operating pins transported by this lever move along the slots of the respective shutter blades actuating or rotating the blades into an open position, as before explained, with respect to the first embodiment.

The shutter-closing group of blades 90 comprise a slit-forming blade 90a having a straight leading edge $90a_1$ for forming the slit. A swinging blade 90b is pivotally mounted on a pivot $90b_3$ which is supported on the slit-forming blade of this group. The slit-forming blade is itself pivotally mounted and transported on the pivots $8a_1$, $90a_2$. The remaining closing shutter blades 90c–90e are pivotally mounted on a pivot 10.

The slit-forming blade of the shutter-closing group is transported separately by the parallel levers or arms 7, 8 and a pin 7b is received in slots $90c_1$–$90e_1$ of the corresponding pivoted blades of the group. A second actuating pin 7c on the principal operating levers received in an elongated slot $99b_1$ of the swinging blade.

In both embodiments the swinging blades have free ends, for example, $90b_2$, $50b_2$ which extend past the exposure aperture 2. The swinging shutter blades and the slit-forming shutter blades are actuated separately from the remainder of the shutter blades of the two groups. The slit-forming shutter blades have straight edges that move normal to the medial plane of the shutter aperture so that a uniform slit is developed in opening and closing of the shutter.

Those skilled in the art will recognize that whle the closing pawl has been described as controlled by use of an electromagnet, it is possible to control its release by a mechanical delay mechanism. The arrangement of the two separate shutter blade groups reduces the inertia of the shutter blades so that the operating mechanism can operate them at a higher speed. Furthermore, the mounting of the slit-forming shutter blades for actuation and support by a respective set or pair of parallel levers, in the manner illustrated, as well as separately from the remainder of the related shutter blades within the respective groups, allows optimum control of the individual slit-forming blades and allows for making a uniform slit in opening or closing the shutter.

The use of parallel arms for operating the slit-forming shutter blades results in a more stable operation of these blades and the support points or connections pass, in both instances, along a central plane of the light-passage window or exposure apertures of the shutter. This greatly improves the uniformity of the slit developed when the shutter is opened and closed. Furthermore, dividing the arrangement in the manner in which it has been accomplished makes it possible to make the parallel arms smaller or to reduce the size of the focal plane of the shutter. The construction can likewise be made more simple.

What I claim and desire to secure by letters Patent is:

1. In a focal-plane type shutter for a camera the combination of:

means defining a shutter aperture;

a first group and a second group of shutter blades, each group alternately opening and closing said aperture when each is in an opening and closing position, respectively, and each group having a slit-forming shutter blade, a swinging shutter blade and a plurality of other shutter blades;

means mounting said first group of shutter blades for cooperative movement in a general direction from the opening position to the closing position thereof, and reverse; and means mounting said second group of shutter blades for cooperative movement from the opening to the closing position thereof, and reverse, in a general direction opposite to that of said first group;

the mounting means of each group comprising: pivot means, parallel lever means pivotally mounted thereat connected to the corresponding slit-forming shutter blade for displacement of that blade into the opening position thereof when the respective lever means move in a first angular direction, means mounting said swinging shutter blade for displacement in response to moving of the respective lever means and in angular direction opposite to that of the respective moving of the respective lever means, and means mounting said other shutter blades for sequential displacement in response to angular moving of the respective lever means and in the same angular direction as the same.

2. In a focal-plane type shutter, a combination according to claim 1, wherein said aperture is rectangular, wherein said slit-forming shutter blade has a leading, straight edge, and wherein said lever means includes means for maintaining said straight edge parallel to a side of said aperture.

3. In a focal-plane type shutter, a combination according to claim 1, wherein said means mounting said swinging shutter blade includes additional pivot means disposed on said slit-forming blade and movable therewith, for pivotally connecting said swinging shutter blade to said lever means, and wherein said means mounting said other shutter blades includes third pivot means and means pivotally mounting said other blades thereat for pivotally connecting each of said other blades to said lever means.

4. In a focal-plane type shutter, a combination according to claim 3, which includes two pairs of pivots, one pair of each parallel lever means, and wherein each parallel lever means comprises two levers and means pivotally mounting each, at one end portion thereof, to one pivot of one of said pairs of pivots, and pivotally mounting each, at the other end portion thereof, relative to the respective slit-forming shutter blade.

5. In a focal-plane type shutter, a combination according to claim 3, including a pivot for one of said levers of each pair of parallel levers, the latter pivot being disposed on the respective slit-forming shutter blade.

6. A focal-plane type shutter according to claim 3, wherein the means connecting said swinging shutter blade and the means connecting said other shutter blades to said lever means comprise means defining an elongated slot in said swinging shutter blade and a slot in each of said other shutter blades, and two pins, each connected to said lever means, one received in the slot in said swinging shutter blade and one received in the slots in said other shutter blades.

* * * * *